United States Patent [19]

Wreede et al.

[11] Patent Number: 4,826,290

[45] Date of Patent: May 2, 1989

[54] METHOD OF PRODUCING STABLE HOLOGRAMS IN DICHROMATIC GELATIN

[75] Inventors: John E. Wreede, Monrovia; James E. Scott, Culver City, both of Calif.

[73] Assignee: Hughes Aircraft Company, Los Angeles, Calif.

[21] Appl. No.: 99,280

[22] Filed: Sep. 21, 1987

[51] Int. Cl.$^4$ .................... G02B 27/00; G03H 1/04
[52] U.S. Cl. .................... 350/320; 350/3.61; 430/1
[58] Field of Search .................... 350/320, 3.61, 3.65, 350/3.66, 3.68, 3.69, 3.72; 430/1, 12

[56] References Cited

U.S. PATENT DOCUMENTS

| | | | |
|---|---|---|---|
| 3,594,167 | 7/1971 | Laming et al. | 350/3.61 |
| 3,617,274 | 11/1971 | Lin | 350/3.61 |
| 3,660,091 | 5/1972 | Shankoff et al. | 350/3.61 |
| 3,816,130 | 6/1974 | Eggers et al. | 430/1 |
| 3,967,963 | 7/1976 | Graube | 350/3.61 |
| 4,187,106 | 2/1980 | Gladden | 430/1 |
| 4,458,977 | 7/1984 | Arns et al. | 350/3.65 |
| 4,530,564 | 7/1985 | Close | 350/3.72 |

OTHER PUBLICATIONS

Applied Optics, vol. 7, pp. 2101–2105 (1968) by T. A. Shankoff.
Applied Optics, vol. 8, pp. 2346–2347 (1969) by Brandes et al.

Primary Examiner—John K. Corbin
Assistant Examiner—Loha Ben
Attorney, Agent, or Firm—Leonard A. Alkov; A. W. Karambelas

[57] ABSTRACT

A method of developing a holographically recorded interference pattern in a dichromatic gelatin structure is provided. The process includes developing the hologram pattern by hydration and dehydration, baking the developed hologram pattern at a temperature equal or above 120° C. for approximately 24 hours, rehydrating the developed hologram and dehydrating the developed hologram at a temperature of approximately 60° C. for approximately 48 hours until the design wavelength response is attained to provide a stabilized hologram.

17 Claims, 1 Drawing Sheet

METHOD OF PRODUCING STABLE HOLOGRAMS IN DICHROMATIC GELATIN

BACKGROUND OF THE INVENTION

1. Field of the Invention

The present invention is directed to an improved production process of manufacturing holograms and more particularly to a production process for manufacturing dichromated gelatin holograms in an expedient manner.

2. Description of the Prior Art

The advantages of using holograms for various displays is well known. Commercially, holographic optical elements are being used for numerous purposes such as head-up displays (HUD), head-down displays, laser eye protection visors, helmet-mounted displays, simulator domes and solar concentrators. There is a desire to provide a production capacity to meet the demands for these holographic optical elements.

It has been known to use various emulsions such as hardened gelatin films as the medium for the recordation of information by holography. Usually the hardened gelatin film is sensitized to exhibit a light response by contacting it with an appropriate sensitizer solution. The sensitized gelatin film is then exposed in the usual holographic manner and then the gelatin plate is subsequently desensitized and developed to be stabilized for a period of time commensurate with the expected life of the holographic optical element.

An example of a pre-exposure hardened gelatin film can be found in U.S. Pat. No. 3,617,274. Additionally, a discussion of the various types of dichromatic gelatin and procedures for developing the same can be found in "Topics in Applied Physics, Holographic Recording Materials", Volume 20, 1977, edited by H. M. Smith.

The prior art has proposed hardening of the gelatin before processing or during the liquid processing development of the holographic images. Most of these processes use a thermal or actinic agent to harden the gelatin via crosslinking with dichromate ions. There have been other attempts to use gelatin hardeners such as aldehydes or commercial fixers with a hardener (a photographic fixer itself has no fixing affect on non-silver halide films). The effect of crosslinking the gelatin is to reduce the efficiency of the hologram. Attempts to restore efficiency by processing at hotter temperatures presents the problem of making the gelatin softer. Consequently, no net gain was obtained.

Another concern in the prior art has been shrinkage. The present understanding of the shrinkage of a gelatin film is that the shrinkage occurs in four distinct possible mechanisms. The first of these is a loss of water. Shrinkage of the gelatin due to loss of water is nearly equivalent to the volume of water lost. The water can occur as interstitial or as fairly loosely bound water. In either case, the bulk of the water comes off fairly rapidly (less than one day at 60° C.).

The second mechanism is a loss of the triethanolamine (TEA) which had been used in the original swelling of the gelatin. There is a chemical bond formed due to the amphoteric nature of the gelatin. There is relatively little TEA, as the change is small. Since its vapor pressure is so low (especially in the bound form) it only comes off at high temperatures (BP 335° C.).

A third mechanism is a loss of bound alcohol. According to standard theories by people who have monitored alcohol being desorbed, the alcohol contributes to the index modulation and a loss of alcohol should result in a loss of efficiency. This does not occur below 120° (higher in the hardened gelatin).

The fourth mechanism is a molecular arrangement of the polymeric chains. This is probably thermal crosslinking. Alone among the four shrinkage mechanisms, this one provides a possible non-reversible reaction. This extent of rearrangement is a linear function of the logarithm of time and the rate increases by a factor of about 2.2 for every 10° C. We assume that water loss and molecular crosslinking are the two primary mechanisms.

It is known that the wavelength of dichromated gelatin reflective holographic optical elements change as a logarithmic function of time and temperature. The rate of change with time varies by a factor of about 2.2 for every 10° C. change in temperature. A standard method of achieving thermal stability in the production of a HUD hologram is to bake it for extended times at relatively high temperatures. Approximately a one-month period of baking or stabilizing at 100° C. will insure that the rate of change in a wavelength with time will be so slight that effectively no noticeable further change will occur at the operating temperatures during the usable life of a holographic optical element in a HUD.

As noted by T. A. Shankoff in "Applied Optics", Volume 7, Page 2101 (1968), an optically-induced phase shift of an exposed and developed hardened dichromatic gelatin plate could be increased by changing the development process of the hologram. This article suggested developing the hologram in mildly agitated water at 35° C. for approximately 30 seconds, dipping the gelatin plate in isopropanol for 30 seconds and then air drying with a stream of dry air under pressure. The gelatin was saturated with water and fully swollen at the time it was immersed in the isopropyl alcohol and the alcohol was used to replace the water in the gelatin. The isopropyl alcohol dried the gelatin layer extremely rapidly because it did not dissolve the gelatin and it does not wet it. It was further observed that the developed hologram could be reimmersed in water and any large index of refraction change would disappear and the hologram efficiency would be returned to a small value. It was noted that the process was reversible if the wet layer was again dried in isopropyl alcohol. Thus, it has been known that a photochemical crosslinking that is produced during the exposure of the dichromated gelatin will remain intact during subsequent steps and that it controls whatever process occurs during the drying step.

With a hardened gelatin plate, the gelatin molecules are tied together into a continuous three-dimensional network. During swelling and shrinking, this network is basically not changed and so the basic photochemical information recorded in the gelatin layer is not destroyed during development in water and remains in the volume independent of the thickness of the gelatin layer. In a reflection type hologram, the wavelengths at which the hologram reflects is a function of the layer to layer distance (grating spacing). Since the number of layers is fixed during the exposure step, this means that the wavelength of the hologram is a direct function of the thickness of the gelatin. It has been recognized that the change in the thickness will affect the properties of the hologram and that generally, the thickness of the fully developed emulsion should approximately be equal to that of the gelatin layer during the exposure for minimum aberrations in the diffracted image. Usually, dichromated gelatin utilizes a development procedure which includes a first water-washing step to soften the gelatin for the following drying step. The water-washing step also removes the unreacted dichromate to thereby prevent crystallization and the introduction of scattering centers upon drying.

The washed gelatin plate is immersed wet into a water/isopropyl alcohol mixture and a plurality of baths can be utilized with the last bath being as free of water as possible. There have been proposals to control the dissipation of the alcohol from the developed gelatin plate to maintain the hologram efficiency and to discourage any crystallization of the gelatin plate. Brandes et al., "Applied Optics", Volume 8, Page 2346 (1969), disclosed that light scattering and the sensitivity increased with increasing wash-water temperature and decreased when the sensitized gelatin plates had been hardened more extensively. He proposed developing hardened gelatin plates in a water-wash at 25 to 40° C. followed by dehydration with isopropyl alcohol at 70° C.

Meyerhofer, at Page 90 of "Topics in Applied Physics, Holographic Recording Materials" (1977), proposed preparing a gelatin layer by dip coating with 12 to 18 percent by weight gelatin, from J. T. Baker Chemical Company, USP. Grade, 125 Bloom, suspension in water which was initially mixed at 20° C. with a final stirring at 70° C. and filtering with a heated filter. The mixture was then cooled to 40° C. and $(NH_4)_2 Cr_2O_7$, ammonium dichromate, was added to give a ratio of 0.5 percent to the weight of the gelatin. The glass plate substrate was inserted and withdrawn vertically at a rate of 1 to 5 centimeters per minute. The coated plates were then air dried for 1 hour in a vertical position and then subsequently hardened by baking at 150° C. for 2 hours. The thickness of the gelatin coating on the plate was in the range of 4 microns. The films were dried in the dark and stored at 20° C. or lower for more than 12 hours before exposure. After exposure, the plate was washed for approximately 10 minutes in running water at 20° C. The plate was then soaked for 2 minutes in a mixture of 50 percent isopropyl alcohol and 50 percent distilled water with mild agitation. The plate was then removed and the procedure repeated for 2 minutes in a bath of 90 percent isopropyl alcohol and 10 percent water. Finally, the hologram plate was inserted vertically into a fresh isopropyl alcohol bath with agitation for 10 to 20 minutes as the final bath. The plate was pulled out of the bath at a rate of about 1 centimeter per minute while a flow of hot air was directed against the gelatin.

At ordinary room atmosphere conditions, it was found that dichromated gelatin holograms were relatively stable. The use of a combination of water and alcohol bath was believed to be necessary to prevent an excessive rate of dehydration that could create a high-stress condition and cause a milky-white appearance in the gelatin plate which produced significant light scattering.

U.S. Pat. Nos. 4,530,564, 4,458,977 and 4,312,559 are cited of interest for the production of holographic optical elements.

The demand for high quality display holographic combiners such as required in the production of head-up displays remain. There is still a demand for improved production processes that can maintain the optical quality while increasing the production yield.

SUMMARY OF THE INVENTION

An improved process for developing a holographically recorded interference pattern in a dichromatic gelatin plate and like material is provided. The process provides a shortened production time to increase the yield while maintaining acceptable quality to dichromatic gelatin holographic optical elements. The dichromated gelatin can be provided on a substrate by dip coating, gel mold casting, film transfer or doctor-blading to a thickness of about 20 microns. The dichromated gelatin emulsion is then exposed to produce the holographically recorded interference pattern in a conventional manner. For example, during the exposure it is believed that some of the chromium ions are reduced and react with the gelatin molecules which results in a change in the index of refraction so that a phase hologram can be recorded. To increase the variation in the index of refraction, the exposed plate is hydrated for about 5 minutes at about 20° C., for example, in a solution of deionized water and triethanolamine to cause the gelatin layer to swell up to several times its initial volume. Subsequently, the gelatin layer is dehydrated, for example, by a controlled submersion in a mixture of isopropyl alcohol and water baths at a controlled temperature of about 20° C. for about 20 minutes. Frequently, a series of baths of progressively increasing proportions of alcohol are used with the last bath being pure alcohol to achieve the desired dehydration.

In an alternative embodiment of the present invention, the dehydration step can comprise a bath of isopropyl alcohol and a fluorinated hydrocarbon solution such as Freon.

The developed hologram pattern in the gelatin layer can then be heated or baked at a temperature approximately equal to or above 120° C., for example, in the range of 130° C. to 145° C. until the predetermined design wavelength response is achieved. For example, a developed hologram pattern was baked at approximately 135° C. for approximately 24 hours. At this elevated temperature, the hologram pattern substantially fades. Reprocessing, however, will restore the hologram even though the gelatin layer has hardened considerably. This baked and developed hologram pattern will be rehydrated, for example, in the deionized water and triethanolamine solution at approximately 65° C. for a period of about 5 minutes and then dehydrated again at 65° C. for approximately 20 minutes. The dehydration step can also include a series of alcohol/water baths or the use of an alcohol/Freon bath.

The proposed model for the system then is one in which the first period of baking first removes the water in the gelatin and then allows the non-reversible molecular rearrangement during subsequent higher temperature baking for further shrinkage. The loss of efficiency during this time is reversible. Reprocessing restores the water, TEA, and alcohol and the efficiency but does not remove the basic molecular rearrangement which provides the thermal stability. Since the gelatin is harder, a higher temperature processing is needed to restore the same efficiency. Subsequent baking quickly removes the water, but molecular crosslinking has already occurred and little further baking is needed. The end result is a lower overall elapsed time (since the first bake is at temperatures which quickly cause the rearrangement but cause an efficiency loss) to obtain a particular efficiency and thermal stability.

In practice the first bake stops short of the final wavelength, so that accurate tailoring of the wavelength can be accomplished in the final bake. This is a safety factor to ensure that no overrun occurs. Whereas some of the time advantage is lost, the major savings is still exhibited if the first bake is done to approximately 2 nm above the final desired wavelength.

The developed hologram is again baked a second time at a temperature of approximately one-half the initial baking temperature for approximately twice the initial time period. That is, a second baking can occur at a temperature of approximately 60° C. for a period of 2 days to harden the hologram and to produce a stabilized hologram at a substantially less development processing time than has been conventionally experienced. Thus, an improved process for making a hologram, such as for a heads-up display utilizing a holographic image, can be accomplished with increased yield while maintaining the necessary optical characteristic of the holographic optical element.

The novel features that are considered characteristic of this invention are set forth with particularity in the appended claims. The invention itself, both as to its organization and method of operation as well as additional objects and advantages thereof, will best be understood from the following description when read in connection with the accompanying drawing.

DETAILED DESCRIPTION OF THE PREFERRED EMBODIMENTS

Figure 1:
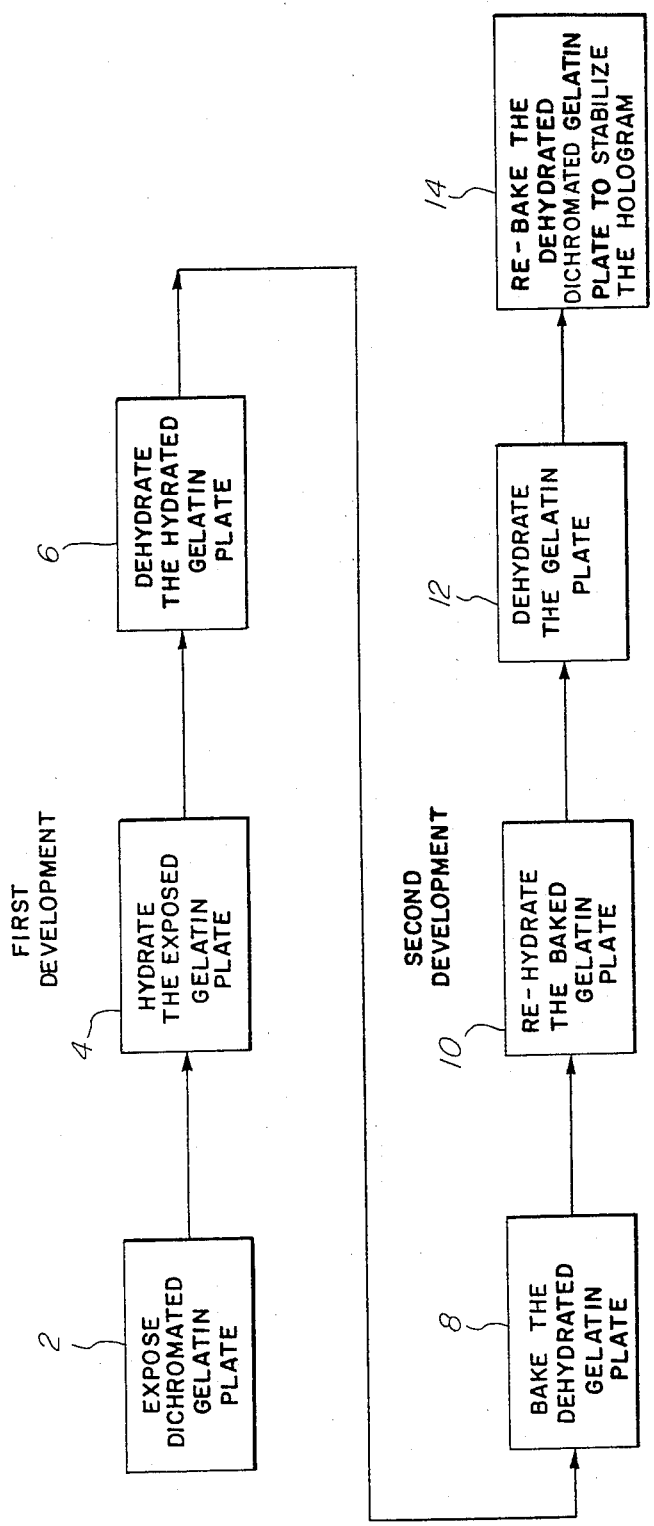
FIG. 1 discloses a schematic illustration of the process steps for producing a stabilized dichromatic gelatin hologram.

The following description is provided to enable any person skilled in the holographic field to make and use the invention and sets forth the best modes contemplated by the inventors for carrying out their invention. Various modifications, however, will remain readily apparent to those skilled in the art, since the generic principles of the present invention have been defined herein specifically to provide an improved production process for manufacturing high-quality holographic optical elements from dichromatic gelatin plates and similar material.

Referring to FIG. 1, the dichromated gelatin plate referred to in step 2 of the present invention can be formed in a conventional manner. As known in the prior art, gelatin is a natural protein collagen which can be obtained from animal sources. The collagen molecules can be broken into regularly shaped polypeptide chains of amino acids which constitute the gelatin. As can be appreciated because of the natural origin of the basic gelatin material, the chemical composition and structure of the gelatin can vary from one sample to another and accordingly, the process steps defined herein can be varied within the broad generic teaching to accommodate those variations which are known to the prior art. One type of gelatin which has been used is 300 bloom type A porkskin. It has also been known to sensitize the gelatin material to form a photosensitive layer with, for example, ammonium, sodium and potassium chromates and dichromates. In the preferred embodiment disclosed herein, ammonium dichromate in gelatin is utilized due to the high solubility of $(NH_4)_2 Cr_2O_7$ in water. This feature permits a high concentration of ammonium dichromate to be dispersed into the colloid without crystallization taking place during the drying of the coating.

For HUD (head-up display) combiner production, the dichromated gelatin can be cut or molded into a substrate with a diameter of about 15 inches and a thickness of about 20 microns. An average thickness for holograms in general will range from about 5 microns to 100 microns for the present procedure.

The prior art is aware that gelatin has a practical advantage in that it can absorb large quantities of liquids and that the liquids can penetrate it rapidly, thus facilitating subsequent processing steps. The gelatin can also be hardened to various degrees by chemical crosslinking to change its mechanical properties and when it is well-hardened, it remains relatively insoluble to high temperatures. When the gelatin has been sensitized with dichromate ions, its subsequent exposure to light initiates a photochemical process with an end product of chromium oxide, $Cr_2O_3$, that can react with the polar part of the gelatin molecule and can cause a crosslinking of the gelatin molecules because the photochemical process requires at most only a few dichromate ions in the adjacent gelatin molecules. The developed gelatin exhibits a very high spatial resolution and this resolution can be degraded in subsequent processing steps which can result in an amplification of recorded information. As a result of the reduction of the chromium oxide, a small change in the index of refraction occurs so that a phase hologram can be recorded within the gelatin layer.

Referring to FIG. 1, the dichromatic gelatin plate is appropriately exposed to provide the desired image in step 2. For example, in a HUD it is highly desirable to provide a relatively lightweight aspheric reflection surface that is particularly advantageously formed with a hologram. Thus, the dichromatic gelatin can be placed on an appropriate substrate, such as a glass plate, and index matched with a mineral oil to a reference object such as a specially ground aspheric mirror. This recording module can then be appropriately exposed to light of the desired wavelength such as by a reflective hologram development procedure as known in the art. The dichromatic gelatin plate can then be cleansed of the matching index oil and the holographic interference pattern can be appropriately developed.

In accordance with step 4, the gelatin plate can be washed and hydrated in a deionized water bath at a temperature of approximately 15° C. to 35° C. for a period of time of approximately 30 seconds to 10 minutes, e.g. a temperature of approximately 23° C. for a period of time of 5 minutes has been found to be adequate. The triethanolamine solution comprises 4.5 grams per liter of water. During this step 4, the gelatin layer swells to approximately 2 to 3 times its original thickness.

The gelatin plate is then immersed in Step 6 in a bath of 75 percent deionized water and isopropyl alcohol, also in a temperature range of approximately 15° C. to 35° C. (23° C.) for a period of 5 minutes. Subsequently, the gelatin plate is removed and placed in a second bath comprising 10 percent deionized water and 90 percent isopropyl alcohol again at a temperature of approximately 23° C. for a period of 5 minutes. Finally, the dehydration step 6 is completed by immersing the gelatin plate in a bath of 100 percent isopropyl alcohol at 23° C. for 5 minutes. Such a procedure can result in about a 95 percent reflectance efficiency for a hologram structure having a design wavelength of about 550.5 nanometers and a bandwidth of about 17 nanometers. In the production of HUD combiners, the desired wavelength is 5435 angstroms and an adjustment in the exposure angle is made for the fact that a suitable laser source of such a wavelength is not commercially available.

Alternatively, the dichromated gelatin hologram can be dehydrated through a combination of a single or a series of identical baths or sprays composed of a non-flammable isopropyl alcohol, isopropanol or 2-propanol and fluorinated hydrocarbon mixture. Freon is the commercial trademark of a liquid fluorinated hydrocarbon product sold by the E. I. Dupont Company which has been used. The ratio of fluorinated hydrocarbon to alcohol, for example, can be within the range of about 3:1 to about 1:3.

In step 8, the dehydrated gelatin plate is baked at a temperature above the softening temperature of the gelatin of about 120° C. to 145° C. For the particular gelatin used, this was preferably within the range of 130° C. to 145° C. for approximately 24 hours until the proper wavelength is reached. Above 145° C., the fading was too rapid to measure the wavelength and oxidation occurred. Previously in the manufacturing of dichromatic gelatin holograms for HUD combiners, thermal stability was achieved by baking the hologram at approximately 100° C. for approximately 1 month. The present process step is an endeavor by the inventors to provide a similar result by baking at a higher temperature for a shorter period of time despite the fact that it has been known that the efficiency of a hologram begins to degrade at a temperature above 120° C. Thus, step 8 bakes the gelatin plate at a high temperature until the proper reflection wavelength or slightly above the proper wavelength is reached.

The present understanding of the shrinkage of a gelatin film is that the shrinkage occurs in four distinct possible mechanisms. The first of these is a loss of water. Shrinkage of the gelatin due to loss of water is nearly equivalent to the volume of water lost. The water can occur as interstitial or as fairly loosely bound water. In either care, the bulk of the water comes off fairly rapidly (less than one day at 60° C.).

The second mechanism is a loss of the triethanolamine (TEA) which had been used in the original swelling of the gelatin. There is a chemical bond formed due to the amphoteric nature of the gelatin. There is relatively little TEA, as the change is small. Since its vapor pressure is so low (especially in the bound form) it only comes off at high temperatures (BP 335° C.).

A third mechanism is a loss of bound alcohol. According to standard theories by people who have monitored alcohol being desorbed, the alcohol contributes to the index modulation and a loss of alcohol should result in a loss of efficiency. This does not occur below 120° (higher in the hardened gelatin).

The fourth mechanism is a molecular rearrangement of the polymeric chains. This is probably thermal crosslinking. Alone among the four shrinkage mechanisms, this one provides a possible non-reversible reaction. This extent of rearrangement is a linear function of the logarithm of time and the rate increases by a factor of about 2.2 for every 10° C. It is assumed, however, that water loss and molecular crosslinking are the two primary mechanisms.

Since the hologram pattern has faded, it is necessary to provide a second development and accordingly, in step 10, the baked gelatin plate is rehydrated with the hydration bath again comprising the same deionized water solution, at a temperature of about 65° C. for approximately 5 minutes. The gelatin again swells and a dehydration step 12 is repeated, which is similar to the step 6, with the redevelopment temperature, however, being at about 65° C. for a period of time of 5 minutes. Also as with the previous step 6 for dehydration, a series of baths of either deionized water and alcohol, or alcohol and fluorinated hydrocarbon, can be utilized to restore the same reflectancy efficiency. During dehydration the solution should uniformly contact the gelatin and appropriate agitation or even spraying can be used to provide a uniform dehydration rate.

In step 14, the dehydrated gelatin plate is then quickly baked to the desired wavelength for approximately 48 hours at 60° C. This serves to stabilize the hologram for the intended life of the holographic optical element, that is, the gelatin is harder and there will be no significant wavelength shift at operational temperatures and humidity of the holographic element.

The described process then is one in which the first period of baking, step 8, first removes the water in the gelatin and then allows the non-reversible molecular rearrangement during subsequent higher temperature baking for further shrinkage. The loss of efficiency during this time is reversible. Reprocessing, steps 10 and 12, restores the water, TEA, and alcohol and the efficiency but does not remove the basic molecular rearrangement which provides the thermal stability. Since the gelatin is harder, a higher temperature processing is needed to restore the same efficiency. Subsequent rebaking, step 14, quickly removes the water, but molecular crosslinking has already occurred and little further baking is needed. The end result is a lower overall elapsed processing time (since the first bake is at temperatures which quickly cause the rearrangement but cause an efficiency loss) to obtain a particular efficiency and thermal stability.

In practice the first bake, step 8, stops short of the final wavelength, so that accurate tailoring of the wavelength can be accomplished in the final bake. This is a safety factor to ensure that no overshoot of the wavelength occurs. However, while some of the time advantage is lost, the major savings is still exhibited if the first bake is done to approximately 2 nm above the final desired wavelength. For example, the rebake, step 14, causes the gelatin to quickly return to wavelength attained in the initial bake of step 8. Thereafter, further baking causes further shrinkage and further change in the wavelength at a much slower rate.

During the final baking the wavelength can be monitored by monitoring the reflected light at a known angle of incident to achieve the desired thickness and corresponding wavelength.

While additional processing steps have been added, when compared to the conventional procedure, it is clear that high stability has been achieved in a relatively short time of approximately 3 days instead of the prior art time of 3 to 4 weeks for HUD combiners. As can be appreciated, this savings is important when the baking process is the rate determining step in the development and stabilization of a hologram in a dichromatic gelatin structure. This advantage is particularly beneficial in the manufacturing of holograms for head-up displays.

In conclusion, the inventors have provided a method of developing a holographically recorded interference pattern in a dichromated gelatin through a series of developing the hologram pattern by hydration and dehydration, baking the developed hologram pattern at a temperature above 120° C. until the predetermined wavelength response is achieved. Providing a second development of a gelatin plate through hydrating and dehydrating at an elevated temperature and finally again baking the developed hologram plate in a temperature range of approximately one-half the initial baking temperature for approximately twice the initial baking time period whereby a stabilized hologram is provided.

As can be readily appreciated by a person of ordinary skill in this field, changes in the process parameters can be made to adjust for the thickness of the gelatin layer, the particular gelatin utilized and variations between temperature and time as would be expected to a person of skill while still practicing the present invention. Accordingly, the scope of the present invention should be measured solely from the following claims.

What is claimed is:

1. A method of developing a holographically recorded interference pattern in a dichromated gelatin and the like, comprising the steps of:
    developing the hologram pattern in the dichromated gelatin by contact with predetermined liquids,
    heating the developed hologram pattern after removal from the liquids;
    redeveloping of the heated hologram pattern by contact with predetermined liquids, and
    reheating the redeveloped hologram pattern until a predetermined wavelength response is achieved whereby a stabilized hologram is produced in a relatively short time period.

2. The method of claim 1 wherein the hologram pattern is developed in a series of hydration and dehydration baths.

3. The method of claim 2 wherein the hydration and dehydration include deionized water and alcohol baths.

4. The method of claim 1 wherein the developed hologram pattern is heated to a temperature above the softening temperature of the dichromated gelatin for approximately 24 hours.

5. The method of claim 4 wherein the hologram pattern is reheated for stabilization at a temperature less than the softening temperature for approximately 48 hours.

6. The method of claim 1 wherein the hologram pattern is redeveloped in a series of hydration and dehydration baths.

7. The method of claim 1 wherein the redeveloping is performed at a temperature of about 65° C.

8. The method of claim 1 wherein the developed hologram pattern is heated to a temperature above about 120° C. and less than 150° C.

9. A method of developing a holographically recorded interference pattern in a dichromated gelatin comprising the steps of:
    developing the hologram pattern by hydration and dehydration of the dichromated gelatin;
    initially baking the developed hologram pattern at a temperature above the softening temperature of the gelatin for an initial time period until a predetermined wavelength response is achieved;
    redeveloping by hydrating the initially baked hologram;
    redeveloping by dehydrating the initially baked hologram, and
    baking the redeveloped hologram a second time at a temperature less than the initial baking temperature until a stable hologram having a desired wavelength response is produced.

10. The method of claim 9 wherein the developed hologram is initially baked at a temperature above about 120° C.

11. The method of claim 9 wherein the developed hologram pattern is baked between 130° C. to 145° C. for approximately 24 hours.

12. The method of claim 9 wherein the second hydrating and dehydrating steps were performed at a temperature range of approximately 50° to 70° C.

13. The method of claim 9 wherein the predetermined wavelength response of the initial baking is above the desired wavelength of the second baking.

14. A method of developing a holographically recorded interference pattern in a dichromated gelatin comprising the steps of:
    developing the hologram pattern by hydration and dehydration of the dichromated gelatin;
    initially baking the developed hologram pattern at a temperature above the softening temperature of the gelating until a predetermined wavelength response about a desired wavelength is achieved;
    redeveloping by hydrating the initially baked hologram;
    redeveloping by dehydrating the initially baked hologram, and
    baking the redeveloped halogram a second time at a temperature less than the initial baking temperature until the desired wavelength response is achieved.

15. The method of claim 14 wherein the hydration and dehydration steps occur at approximately a temperature of 65° C.

16. The method of claim 14 wherein the second baking time is for a period of approximately 48 hours at approximately 60° C.

17. A method of developing a holographically recorded interference pattern in a dichromated gelatin comprising the steps of:
    developing the hologram pattern by hydration and dehydration of the dichromated gelatin, at a temperature of approximately 20° C.;
    baking the developed hologram pattern at a temperature approximately equal to or above 120° C. until a predetermined wavelength response from a design wavelength is achieved;
    redeveloping by hydrating the baked hologram at a temperature of approximately 60° C.;
    redeveloping by dehydrating the baked hologram at a temperature of approximately 60° C.; and
    baking the redeveloped hologram a second time at a temperature of approximately one-half the initial baking temperature until a predetermined wavelength response is achieved.

* * * * *